United States Patent
Campbell et al.

(10) Patent No.: US 6,804,878 B1
(45) Date of Patent: Oct. 19, 2004

(54) METHOD OF IMPROVING THE RELIABILITY OF MAGNETIC HEAD SENSORS BY ION MILLING SMOOTHING

(75) Inventors: Richard Thomas Campbell, Campbell, CA (US); Richard Hsiao, San Jose, CA (US); Yiping Hsiao, San Jose, CA (US); Son Van Nguyen, Los Gatos, CA (US); Thao John Pham, San Jose, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 0 days.

(21) Appl. No.: 09/468,603

(22) Filed: Dec. 21, 1999

(51) Int. Cl.$^7$ .......................... G11B 5/112; G11B 5/255; B24B 1/00

(52) U.S. Cl. .................. 29/603.12; 29/603.15; 29/603.16; 29/603.18; 216/22; 216/52; 216/66; 451/41; 204/192.34

(58) Field of Search .......................... 29/603.07, 603.1, 29/603.12, 603.14, 603.15, 603.16, 603.18; 360/236.1, 236.8; 216/22, 52, 66, 88; 451/5, 41; 204/192.34

(56) References Cited

U.S. PATENT DOCUMENTS

| | | | |
|---|---|---|---|
| 4,130,847 A | 12/1978 | Head et al. | |
| 4,333,229 A | 6/1982 | Ellenberger | |
| 4,564,585 A | 1/1986 | Blaske et al. | 430/313 |
| 4,624,736 A | 11/1986 | Gee et al. | 216/65 |
| 4,855,854 A | 8/1989 | Wada et al. | |
| 4,878,290 A | 11/1989 | Masud et al. | 29/603.14 |
| 4,893,203 A | 1/1990 | Ezaki et al. | |
| 4,894,740 A | 1/1990 | Chhabra et al. | |
| 4,912,584 A | 3/1990 | Mallary et al. | 360/126 |
| 5,146,379 A | 9/1992 | Iwata et al. | |
| 5,159,508 A * | 10/1992 | Grill et al. | 29/603.12 |
| 5,198,934 A | 3/1993 | Kubo et al. | |
| 5,271,802 A | 12/1993 | Chang et al. | |
| 5,321,882 A | 6/1994 | Zarouri et al. | |
| 5,323,283 A | 6/1994 | Sano | |
| 5,516,430 A | 5/1996 | Hussinger | 216/36 |
| 5,520,716 A | 5/1996 | Takagi et al. | |
| 5,567,333 A * | 10/1996 | Hira et al. | 216/22 |
| 5,624,581 A | 4/1997 | Ihrke et al. | 216/22 |

(List continued on next page.)

FOREIGN PATENT DOCUMENTS

| | | | | |
|---|---|---|---|---|
| JP | 56-89474 | * | 7/1981 | 451/41 |
| JP | 56-148721 | * | 11/1981 | 360/122 |
| JP | 60-136025 | | 7/1985 | |
| JP | A-338049 | | 5/1992 | |

OTHER PUBLICATIONS

Vuchick et al, Tilt Grain Boundaries Induced by Controlled Low–Energy Sputtering of MgO Substrates: Transport Properties and Atomic–Scale Structure, IEEE Transactions on Applied Superconductivity, vol. 5 Part 2, pp. 122–1228, Jun. 1995.*

*Primary Examiner*—A. Dexter Tugbang
(74) *Attorney, Agent, or Firm*—Robert B. Martin; Bracewell & Patterson, L.L.P.

(57) ABSTRACT

A method is provided of smoothing the perturbations on a surface, in particular the surface of a magnetic head slider, the method comprising several steps. At least one air-bearing surface to be smoothed is exposed to an ion species generated from a defined source to form a beam of incident radiation. The beam has a linear axis emanating from the source and thus forms an angle of incident radiation with respect to the surface to be smoothed. The at least one surface is smoothed by exposing the surface(s) to be smoothed to the beam of incident radiation, where the angle of incident radiation is less than 90° relative to a vertical axis drawn perpendicular to the surface to be smoothed. To make a corrosion resistant magnetic head slider, the method further comprises coating the smoothed surface with a layer of amorphous carbon.

13 Claims, 6 Drawing Sheets

U.S. PATENT DOCUMENTS

| | | |
|---|---|---|
| 5,635,082 A | 6/1997 | Yamamoto et al. |
| 5,650,893 A | 7/1997 | Balasna et al. |
| 5,652,687 A | 7/1997 | Chen et al. |
| 5,687,045 A | 11/1997 | Okai et al. |
| 5,761,790 A | 6/1998 | Carr et al. |
| 5,764,454 A | 6/1998 | Hishida |
| 5,822,153 A * | 10/1998 | Lairson et al. ....... 360/236.1 X |
| 5,909,340 A | 6/1999 | Lairson et al. |
| 6,054,023 A | 4/2000 | Chang et al. |
| 6,069,775 A | 5/2000 | Chang et al. |
| 6,212,047 B1 | 4/2001 | Payne et al. |

* cited by examiner

METHOD OF IMPROVING THE RELIABILITY OF MAGNETIC HEAD SENSORS BY ION MILLING SMOOTHING

BACKGROUND OF THE INVENTION

1. Technical Field

The present invention relates in general to carbon coated magnetic head sliders, and in particular to a smoothed slider surface or other surface and a method of smoothing the surface of a slider head or other substrate surface. Still more particularly, the present invention relates to an improved corrosion and impact resistant magnetic head slider that is ion milled prior to carbon coating to improve the coverage of the carbon layer, and the method of producing the improved slider head.

2. Description of the Related Art

Magnetic head slider assemblies for sensing or "reading" magnetically stored data on rotating disc drives are used extensively in computers and other devices where magnetic data storage means are employed. A head assembly includes a suspension and an "air-bearing" slider for carrying a magnetic transducer or sensor proximate the rotating disc. An actuator arm positions the air-bearing slider and sensor over individual data tracks on the continuously rotating disc surface. A gimbal provides a resilient connection which allows the slider to follow the topography of the rotating disc. The so called "air-bearing" refers to the phenomena, described in more detail in the specification, that creates a positive pressure air pocket between the slider and disc that keeps the slider above the disc, thus the slider "flies" relative to the disc.

More specifically, the slider may include at least a pair of side rails which are positioned along its side edges and are disposed about a recessed area. The side rails form a pair of air-bearing surfaces. As the disc rotates, the disc drags air under the slider and along the air bearing surfaces in a direction approximately parallel to the tangential movement of the disc. As the air passes beneath the side rails, friction on the air-bearing surfaces causes air pressure between the disc and the air-bearing surfaces to increase, thus creating a hydrodynamic lifting force that causes the slider to lift and thus "fly" above the disc surface.

Magnetic head sliders are conventionally formed on a substrate in a row or a series of rows, each row having a plurality of heads. Once the heads are fabricated, the substrate is cut to form a row of heads in a side-by-side orientation. While still in a row formation, the thin film magnetic heads are lapped to a predetermined throat height dimension which is very critical to head performance. Once the desired lapped throat height dimension is achieved, this height should ideally be unaffected by subsequent processing of the head in order to achieve optimal performance of the head.

There are several subsequent processes steps in manufacturing the sliders. As a common aspect of the processing of the magnetic head, ion milling is employed. In an ion milling process as it applies to making magnetic sliders, photoresist is spin coated onto the slider. The photoresist is patterned to expose what will become the negative pressure cavity or recessed region between the air-bearing rails of the slider. Finally, the photoresist is removed. This ion-milling process is used to etch a region from the surface of a substrate.

The subsequent steps in the processing of the head form the pattern of the air-bearing rails, thus forming the air-bearing surfaces. Over time, the desired pattern of rails has become increasingly more complex in design so that a dry processing technique such as an etching process is generally used.

There are other uses for protective coatings. When the slider is in use, the rails typically fly within ten microinches from the moving disc. The head can sometimes come into inadvertent contact with the magnetic disc. Thus, the thin film magnetic head is also given a protective coating to protect from this inadvertent contact during use.

Chang et al. (U.S. Pat. No. 5,271,802, assigned to the assignee of the present invention) disclose a method of coating the magnetic head slider in order to protect the head during subsequent processing and during use. Chang et al. disclose a method of coating the slider with a three-layer protective surface made of silicon/carbon/silicon, the first silicon coat being an adhesive layer, and the third silicon layer being a masking layer. The carbon layer is the primary protective layer. This layer on the sliders greatly enhances the lifespan of the slider by protecting the surface from the processing steps that the head undergoes, as well as from conditions faced during the use of the slider in a device such as a computer, conditions such as corrosion due to exposure of the head to natural conditions of humidity, chemical wear, and physical contact with the moving disc.

While the Chang et al. invention improves upon the performance and lifespan of magnetic head readers, over time wear and environmental factors slowly decrease the effectiveness of the carbon coating. It is thus of great interest to improve the protective nature of the carbon coating. One way in which the coating can be improved is to enhance the coverage interface between the substrate surface and the carbon layer. Providing a smoother and cleaner substrate surface would enhance the coverage, and thus a method of improving the surface of a substrate is desired.

To date, ion milling has not been employed to improve the nature of the surfaces to be coated by metal or carbon. Gee et al. (U.S. Pat. No. 4,624,736) disclose a general technique of an ion milling process in conjunction with light activation and its use in the modification of a substrate surface. The process entails generating radical ion species and subjecting the surface to be etched to the incident radical species. This technique employs chemically reactive gases such as silane and carbon tetrafluoride and incorporates the use of UV-emitting laser light. This technique is used to etch and/or deposit chemical species on the surface of a substrate in an area outlined by the beam of laser light.

What is not disclosed in the prior art is a means of improving the coverage of the protective carbon layer on the surface of the slider or other surface using ion milling or other means. Due to the improved life span of the slider when protective carbon layers are employed, it is of great interest to increase the effectiveness of this layer. Thus, what is needed is a means of improving the surface of a substrate prior to depositing a mask, which can be a chemical or metal species, or etching the surface. This invention is directed towards such an improvement.

SUMMARY OF THE INVENTION

It is therefore one object of the present invention to provide a method of smoothing the surface of a substrate, in particular a magnetic head slider/sensor (hereinafter slider), using an ion milling technique.

It is another object of the present invention to provide increase the coverage of the protective carbon coating on a magnetic head slider, thus improving the lifespan of the slider.

It is yet another object of the present invention to provide a method of protecting the slider surface from subsequent processing as well as the final air-bearing rails that are exposed to the environment and physical contact with the disc.

The foregoing objects are achieved as is now described. A method is provided of smoothing the perturbations on the surface of a magnetic head slider, the method comprising several steps. First, at least one air-bearing surface to be smoothed is provided. Next, an ion species is generated from a defined source to form a beam of incident radiation. The beam has a linear axis emanating from the source and thus forms an angle of incident radiation with respect to the surface to be smoothed. Finally, the at least one surface is smoothed by exposing the surface(s) to be smoothed to the beam of incident radiation, where the angle of incident radiation is less than 90° relative to a vertical axis drawn perpendicular to the surface to be smoothed.

To make a corrosion resistant magnetic head slider, the method further comprises coating the smoothed surface with a layer of amorphous carbon. This protects the surface from corrosion and physical impacts. The angle of incident radiation of the method of the invention is between about 40° and 90° relative to the vertical axis of the surface(s) to be smoothed. The beam of radiation is typically between about 200 and 500 volts and a current density between about 0.3 and 1.0 mA/cm$^2$. The carbon layer is typically between about 20 and 1000 Angstroms. There can also be an adhesive layer placed on the smoothed surface before the carbon layer is added. The various layers are deposited using magnetron sputtering or ion beam deposition.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT
MAGNETIC HEAD SLIDER

Figure 1:
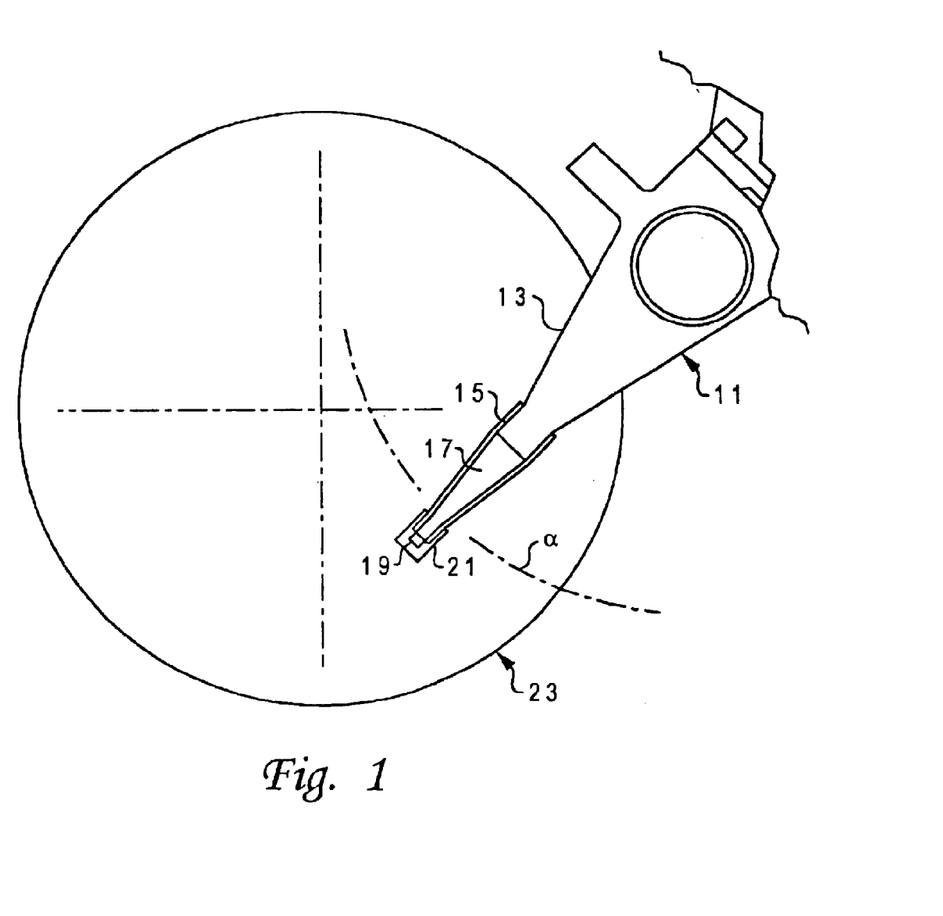
FIG. 1 is a top view of an actuator arm supporting a magnetic head slider over a rotating disc.

With reference now to the figures and in particular with reference to FIG. 1, a magnetic head slider is shown attached to an actuator arm as when inside a device such as a computer hard drive. The actuator 11 includes a supporting arm 13, a base plate 15, and a load beam 17. The suspension 19 is attached to load beam 17, which in turn carries an air-bearing slider 21. The actuator arm 11 swings the slider in an arc ($\alpha$) over the continuously rotating magnetic storage disc 23.

Figure 2:
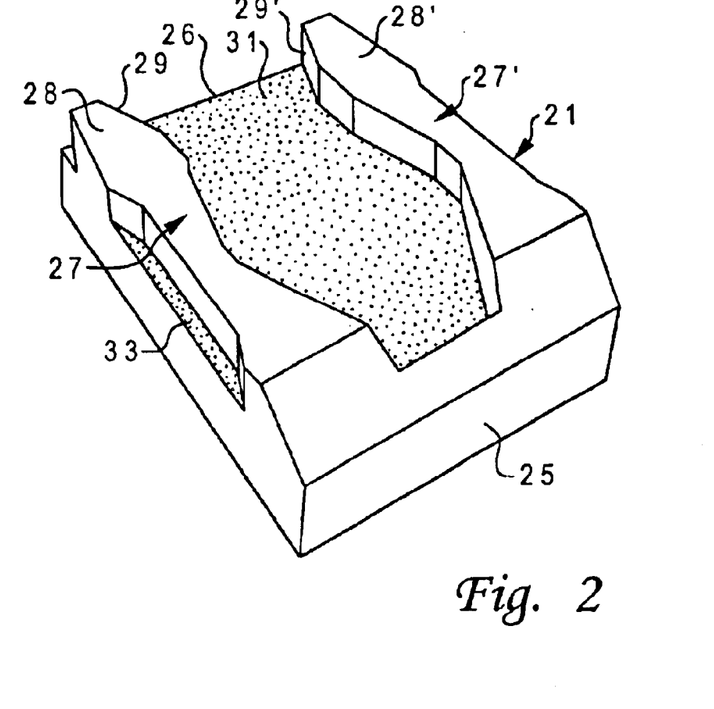
FIG. 2 is a perspective view of a typical processed head slider with air-bearing surfaces.

One embodiment of a slider 21 is shown in greater detail in FIG. 2. The slider is made up of a leading edge 25 which faces counter to the direction of the rotation of the disc 23, and trailing edge 26. The magnetic reader is located on the trailing edge 26 (not shown). Slider rails 27 and 27' are raised portions surrounding a recessed portion 31, being joined at the sides 29 and 29'. The surfaces 28 and 28' are the air-bearing surfaces of the invention, the surfaces facing the rotating disc 23 when in operation. Portion 33 is a recessed portion adjacent to the rail 28, there also being another such portion adjacent to rail 28' (not shown).

The creation of an "air-bearing" surface is a central aspect in the design and manufacture of magnetic head sliders. The sliders are designed to "read and write" to the magnetic medium over which they float, such as the disc 23. The slider may include at least a pair of side rails which are positioned along its side edges and are disposed about a recessed area. There can be a plurality of magnetic heads and air-bearing rails forming a row. Typically, the side rails form a pair of air-bearing surfaces about a magnetic head. As the disc rotates, the disc drags air under the slider and along the air bearing surfaces from edge 25 to edge 26 in a direction approximately parallel the disc. The force of the air current generated is proportional to the tangential velocity of the moving disc. As the air passes beneath the side rails, skin friction on the rail surfaces causes air pressure between the disc and the surfaces to increase which creates a hydrodynamic lifting force. This force creates a lifting effect on the rails, and hence slider, that causes the slider to lift and thus float or "fly" above the disc 23 surface. Thus, the rail surfaces are supported over the disc by an air-bearing.

Figure 3A:
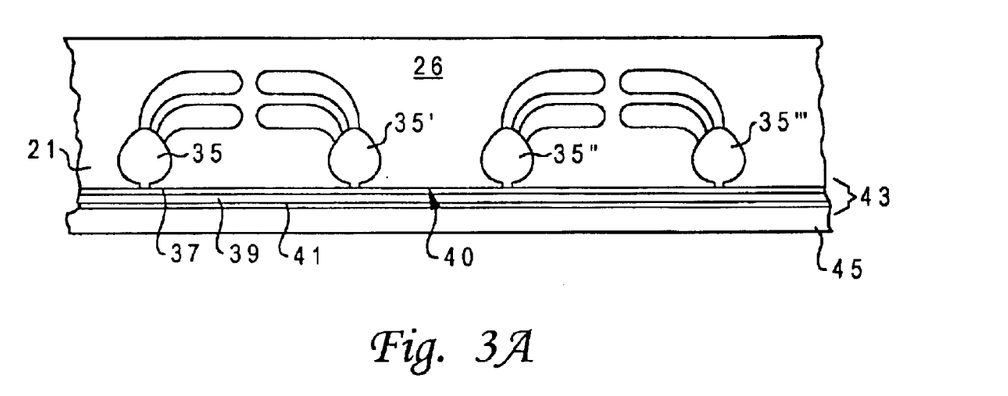
FIGS. 3A–3C comprise views of a partial row of thin film magnetic head sliders showing successive stages in the process for making magnetic head sliders and details thereof.
Figure 3B:
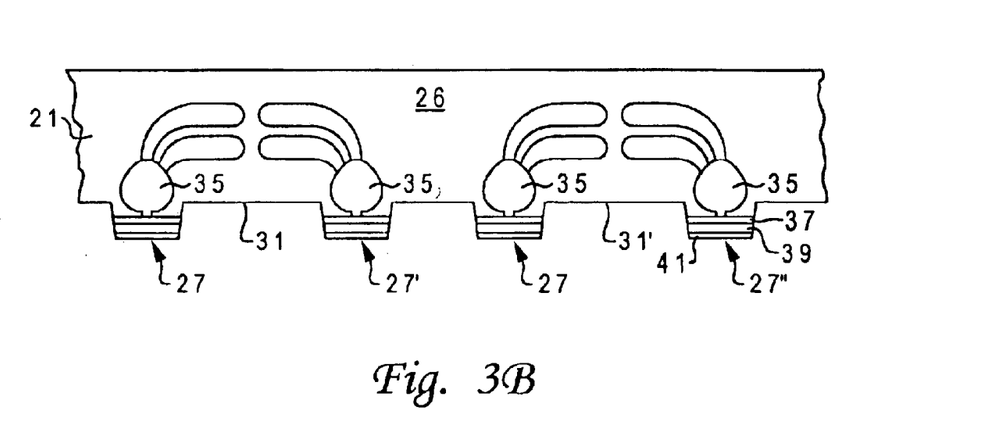
Figure 3C:
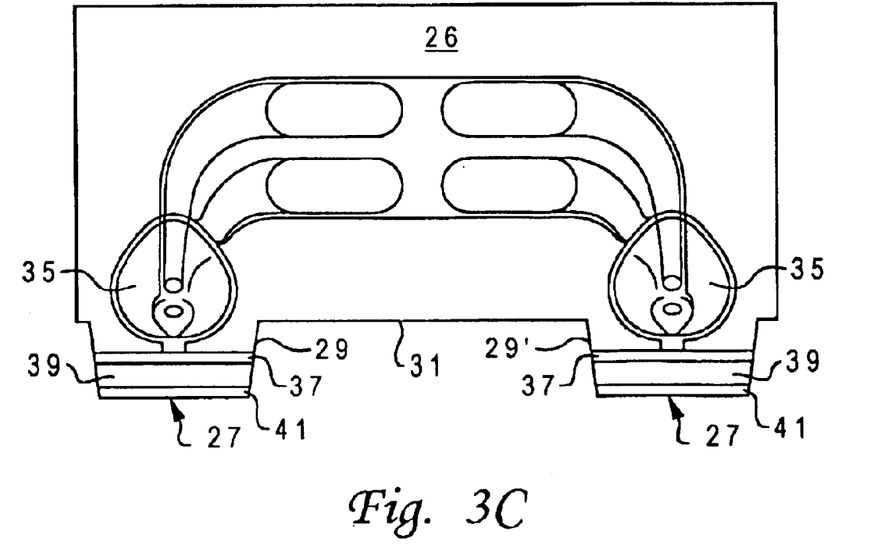

Another embodiment and view of the slider 21 is shown in FIGS. 3A–3C. These views of slider 21 shows the details of the various layers of the material coating of the invention and the manufacturing of the air-bearing rails. It is to be understood that one, two, or more layers of various materials (organic, polymer, metal, etc.) can be deposited on the smoothes surface of the present invention. In the embodiment in FIGS. 3A–3C, the material-coated slider has a series of thin film magnetic heads 35, 35', 35", and 35''' located on the trailing edge 26. These heads form a row or rows of magnetic sliders with associated air-bearing surfaces, each of which can be smoothed by the present invention. These heads are formed by a lapping process prior to the application of the protective layer 43 to the invention. Lapping, film deposition and forming the air bearing features in the slider are accomplished using known techniques such as disclosed in U.S. Pat. Nos. 5,603,156 and 4,301,353, the disclosures of which are incorporated herein be reference for all purposes. After lapping, but before depositing the protective layer, the smoothing of the surface 40 is first performed, as discussed further below.

As shown in the embodiment in FIG. 3A, an adhesive layer 37 is deposited on the surface 40, followed by depositing the carbon layer 39. An optional masking layer 41 can be added, but is not necessary. The adhesive layer can typically be from 10 to 100 Angstroms thick and can be such materials as silicon. The layers form an at least two-layer protective coating 43 on the surface 40 of the slider. This surface is the surface that is to be etched and/or chemically treated to form the rails that will face the rotating disc 23.

The layer of hydrogenated amorphous carbon 39 is deposited to a thickness of about 20–1000 Angstroms on the surface 40, or the surface of layer 37. This and the other layers of protective coating 43 can be deposited by any suitable technique such as sputtering, or ion beam deposition, for example. Either DC magnetron or RF magnetron sputtering can be used.

Finally, a thick layer of a patternable material 45 is deposited on the one, two, or three-layered protective coating 43. The material 45 comprises photoresist material in a preferred embodiment. The photoresist material is exposed through an appropriate mask (not shown) in a negative pattern of the chosen rail configuration, developed and removed in the exposed areas to form the air bearing pattern on the top surface of the slider.

FIG. 3B shows the result of the photoresist etching that has taken place. The result is that, at each magnetic head is a raised rail 27, 27', and 27". Further, recessed portions 31 and 31' are left after etching away the layers of material of layer 43 and a portion of the slider material 21.

Details of two air-bearing rail surfaces 27 and 27' are shown in FIG. 3C. The raised rails are adjoined by the sides 29 and 29', thus forming the recessed portion 31. The layers of material 37, 39, and 41 are left on the rail. The masking layer 41 faces the rotating disc 23.

SMOOTHING

Figure 4A:
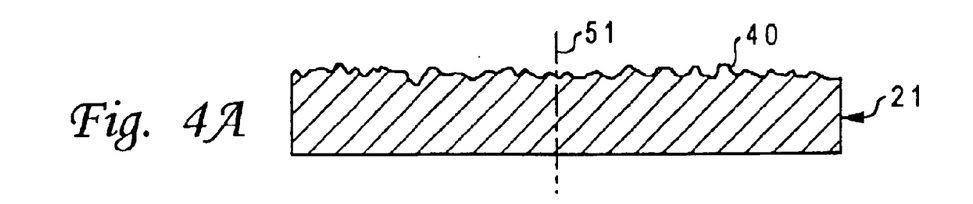
FIGS. 4A–4C are edge-on diagrams of a surface being smoothed by the method of the present invention.
Figure 4B:
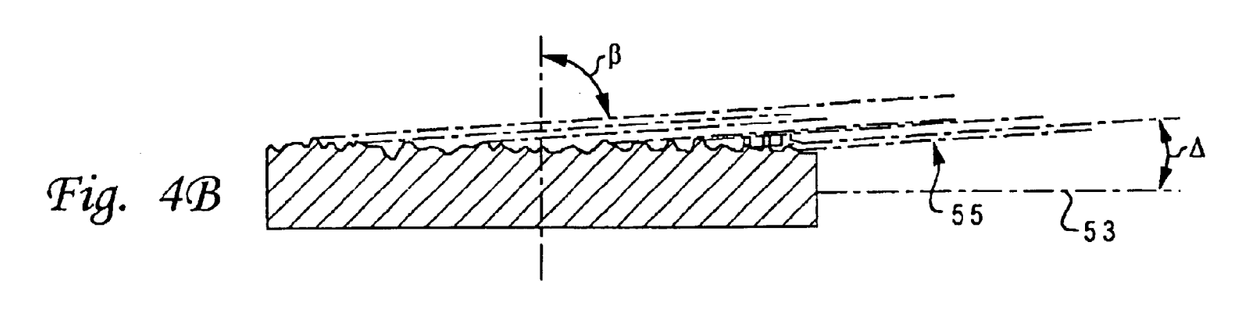
Figure 4C:
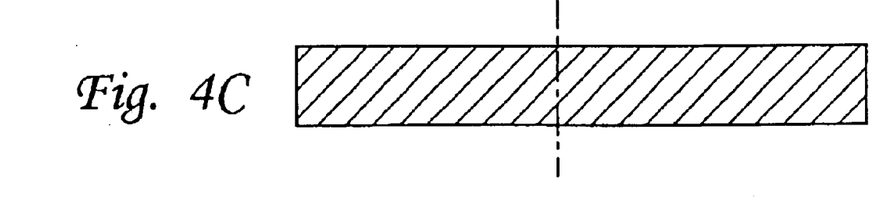
Figure 5A:
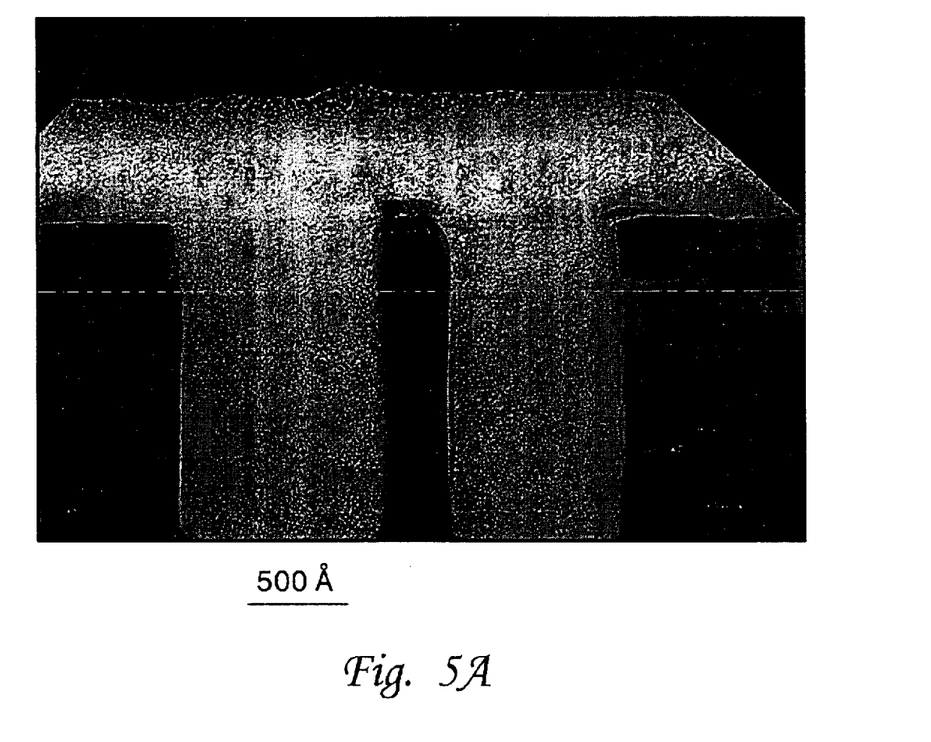
FIGS. 5A–5D are photographs of electron micrographs of a surface before being smoothed and after being smoothed by the method of the present invention.
Figure 5B:
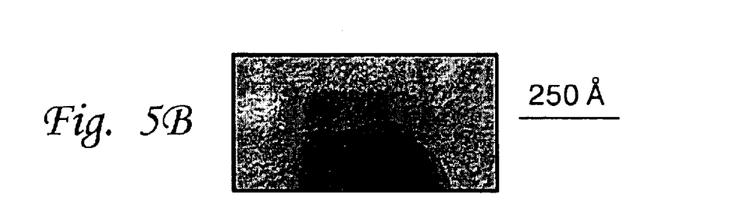
Figure 5C:
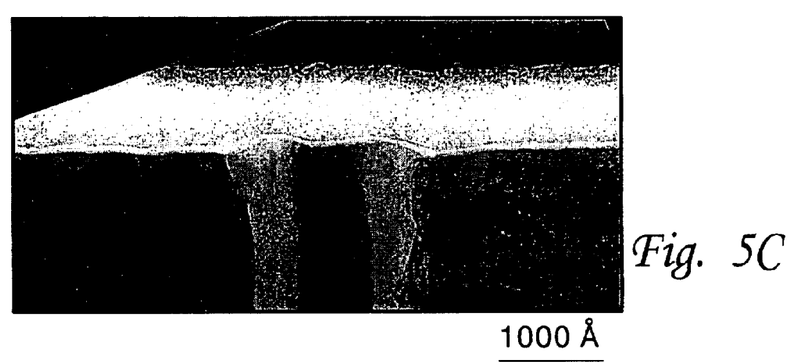
Figure 5D:
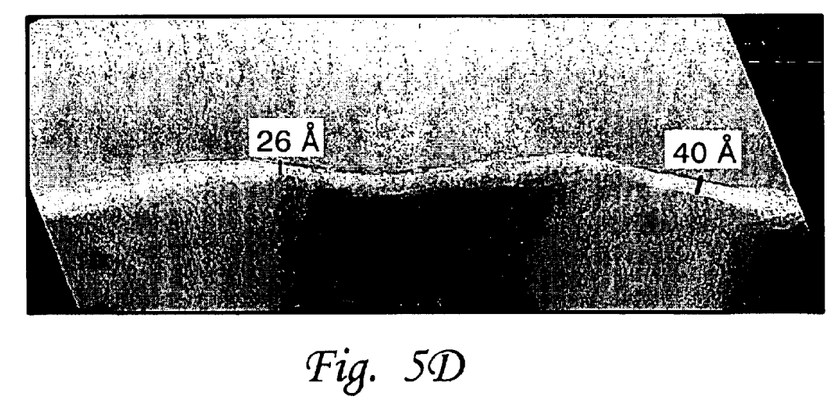

The method of smoothing a surface, and in particular a surface of a slider, by ion milling, is depicted in FIGS. 4A–4C. The smoothing is necessary to increase the effectiveness of the carbon overcoat of the invention. When the carbon overcoat is applied without smoothing the surface of the slider, the perturbations and protrusions on the surface create shallow locations on the carbon overcoat that are more readily exposed to surface and external elements such as physical bumping and humidity.

The at least one surface to be smoothed 40 of slider 21 is placed on a pallet (not shown) that rotates at a rate of between about 5 and 50 rpm. The slider has an axis 51 that is perpendicular to the surface 40, and an axis 53 that is generally parallel to the surface 40. The incident radiation generated by the defined source (not shown) defines liner axis 55.

There are two angles of importance in the present invention and are used to describe the method. The incident radiation axis 55 is at a glancing angle ($\Delta$) relative to parallel axis 53. The angle ($\Delta$) is typically between 0° and 30°, but can be larger. The angle formed by the incident radiation axis 55 and perpendicular axis 51 is angle ($\beta$). The angle ($\beta$), or the milling angle, is defined by the equation:

$$\beta = 90° - \Delta$$

The milling angle $\beta$ can typically be between 40° to 90°. Thus, the incident radiation hits the surface 40 at a glancing angle to mill away the perturbations and impurities on the surface. In going from FIGS. 4A to 4C, the result of the glancing incident radiation is a smooth surface on which to deposit the protective layer 43.

FIGS. 5A–5D show electron micrograph photos of a lapped slider surface before ion milling of the present invention and after ion milling of the present invention. The diagram shows a rough surface 40 with perturbations in FIGS. 5A and 5B. After ion milling (FIGS. 5C and 5D) the surface 40 is smooth, even at high resolution as in FIG. 5D.

PROTECTION OF A SURFACE USING THE METHOD OF THE INVENTION

The method of smoothing a surface is now described in greater detail. In one embodiment of the invention, a surface such as a slider is placed on a pallet. The pallet is typically within a chamber that can be evacuated for ion milling. Also, the pallet typically can rotate between about 5 and 50 rpm. The surface to be smoothed is placed on the pallet with the face (face 40 in the above described embodiment) to be smoothed facing upward, opposite the side resting on the pallet.

Next, ions are generated by a hot filament or ion source. In the present embodiment, the ion species are generated from a gas such as Argon, or a mixture of Argon with Hydrogen, the Hydrogen ranging between about 0.1 percent and 6 percent of the total gas mixture. Typically, the voltage of the source ranges between about 200 volts and 500 volts, and current density ranges between about 0.3 and 1.0 mA/cm$^2$. The ions radiate from the source, thus creating a linear axis originating from the source. The source is placed relative to the pallet and surface to be smoothed such that the linear axis forms a defined angle of incidence relative to the vertical axis 51 drawn perpendicular to the surface (see FIGS. 4A–C). As the ions impinge upon the surface, the pallet rotates, thus rotating the surface to be smoothed. This allows an even and complete coverage of the impinging ions against the surface.

The amount of ion radiation can be controlled by controlling the ion beam current and voltage. Time of exposure can vary from several seconds to several minutes. Table 1 and Table 2 shows various conditions and time of exposures employed in the present invention. Specifically, parameters such as beam voltage and beam current, milling angle, and time of exposure are the primary variables that control the degree of the ion milling process of the invention.

The ions impinging upon the surface to be smoothed act as a milling device, etching away at the surface perturbations arising from the surface. Typically, the perturbations rise vertically or at a steep angle relative to the axis 53 of the surface to be smoothed. The glancing angle ($\Delta$) employed in the present invention creates ions 55 that impinge from the source at a very low angle (see FIG. 4B). This tends to etch the perturbations away from the surface, creating a micro-smoothed surface that is capable of binding surface coating more efficiently. The ion milling process also tends to remove surface impurities from the slider and generally clean the surface, thus improving the binding of surface coating such as carbon.

The increased protective nature of the carbon coating, or carbon overcoat, of the present invention is depicted in Table 1 and Table 2. A NaCl dip test is employed to test the effectiveness of the invention. This test is performed by placing the carbon overcoated sliders in an acidic (HCl) solution of NaCL at room temperature. After the surface is smoothed, the protective layers to be deposited on the surface are deposited, the surfaces were exposed for various lengths of time to a solution of NaCl, and the subsequent failure rates of the parts, in the present embodiment, sliders, were tested. In each case, the slider resistance was tested, and the results expressed as a dR value. The failure rate (dR) is the difference, within a certain indicated percentage change (dR>X %, X being an indicated percentage), in measured resistance and is expressed in two ways: as the number of actual tested surfaces relative to those that fail, and as a percentage (in parenthesis) in each table.

Table 1

6 Hr. NaCl Dip Test: Slider rows milled at β = 70°
prior to carbon overcoat deposition.

| Milling Time (min.) | dR>1% |
|---|---|
| 0 (control) | 41/298 (13.75%) |
| 1 | 4/52 (7.7%) |
| 2 | 1/52 (2%) |

TABLE 2

7 Hr. NaCl Dip Test: Slider rows milled at β = 70° prior to carbon overcoat deposition.

| Milling Time (min.) | dR>1% |
|---|---|
| 0 (control) | 5/75 (6.6%) |
| 2 | 0/45 (0%) |
| 3 | 2/57 (3.5%) |

The results in Tables 1–2 show a dramatic improvement in the effectiveness of the carbon coating, typically 40 to 70 angstroms in each case, to protect the surface of various milled rows of sliders. For example, Table 1 shows that for these slider parts, the ion milling clearly improved the sensor reliability. The failure rate improved from 13.75% to 7.7% for 1 minute exposure and to 1.8% for 2 minute exposure. In another example (not shown in a table), slider rows were milled for 3 minutes using the same milling conditions as above. The parts where then dipped in the NaCl testing solution for 24 hours as more severe testing conditions. In this case, the dR>6% failure rate for control parts was 57%, while that of the milled parts improved to 38%. Generally, protection improved with time of exposure to the ions, or milling time. Also, under less protective carbon layer conditions (carbon overcoat or thinner DLC), there was a trend showing that the glancing angle milling improved the carbon overcoat integrity. Thus, this ion milling invention can be implemented prior to carbon deposition when rows are already bonded to the carrier.

The present invention is an improvement over the prior art of micro-modification of surfaces and the prior art of protective coatings on sliders and other surfaces. The method can be employed using conventional ion generating devices and is thus easy to perform.

The method increases the lifespan and effectiveness of magnetic head sliders by increasing the integrity of carbon and silicon coatings on the surfaces of the slider surface.

The method can be used on a variety of surfaces where micro-smoothing may be required. Magnetic slider heads are one example of the present invention. The invention can be used whenever a smooth surface is required in a process or device.

The slider of the invention is greatly improved from the prior art as indicated by the NaCl dip tests. The sliders last longer and will withstand greater environmental stress, thus increasing the performance of computer hard drives and other devices that use magnetic head sliders or sensors. Further, the carbon coating of the present slider invention is more effective than that of the prior art in protecting the air-bearing surface of sliders.

While the invention has been particularly shown and described with reference to a preferred embodiment, it will be understood by those skilled in the art that various changes in form and detail may be made therein without departing from the spirit and scope of the invention.

What is claimed is:

1. A method for forming a slider, the slider having a top surface, the method comprising:

(a) lapping the top surface of the slider, the top surface being free of deposited material;

(b) generating an ion beam;

(c) removing perturbations on the top surface by exposing the top surface to the ion beam wherein an angle of incidence of the ion beam on the top surface is less than 90°; then (d) depositing a layer of carbon on the top surface; and (e) forming air bearing features in the top surface.

2. The method of claim 1, wherein the ion beam ranges between about 200 and 500 volts.

3. The method of claim 1, wherein the ion beam ranges between about 0.3 and 1.0 mA/cm2 current density.

4. The method of claim 1, wherein the slider is placed on a pallet that rotates about a vertical axis of the top surface.

5. The method of claim 4, wherein a rate of rotation of the pallet ranges between about 5 and 50 rpm.

6. The method of claim 1, wherein the ion beam is generated from a mixture of Argon and Hydrogen.

7. The method of claim 1, wherein the ion beam is generated from Argon gas.

8. The method of claim 1, wherein the layer of carbon is a thickness ranging between about 20 to 1000 Angstroms.

9. The method of claim 1, wherein the top surface is coated with an adhesion layer of silicon after step (c) and before step (d).

10. The method of claim 9, further comprising processing the top surface to form a rail pattern after step (d), the layer of silicon and the layer of carbon remaining on the top surface after the rail pattern is produced.

11. The method of claim 1, further comprising coating the layer of carbon with a layer of material after step (d) and before step (e).

12. The method of claim 1, further comprising processing the top surface to form a rail pattern after step (d).

13. The method of claim 12, wherein the layer of carbon remains on the top surface after the rail pattern is produced.

* * * * *